Feb. 3, 1925.

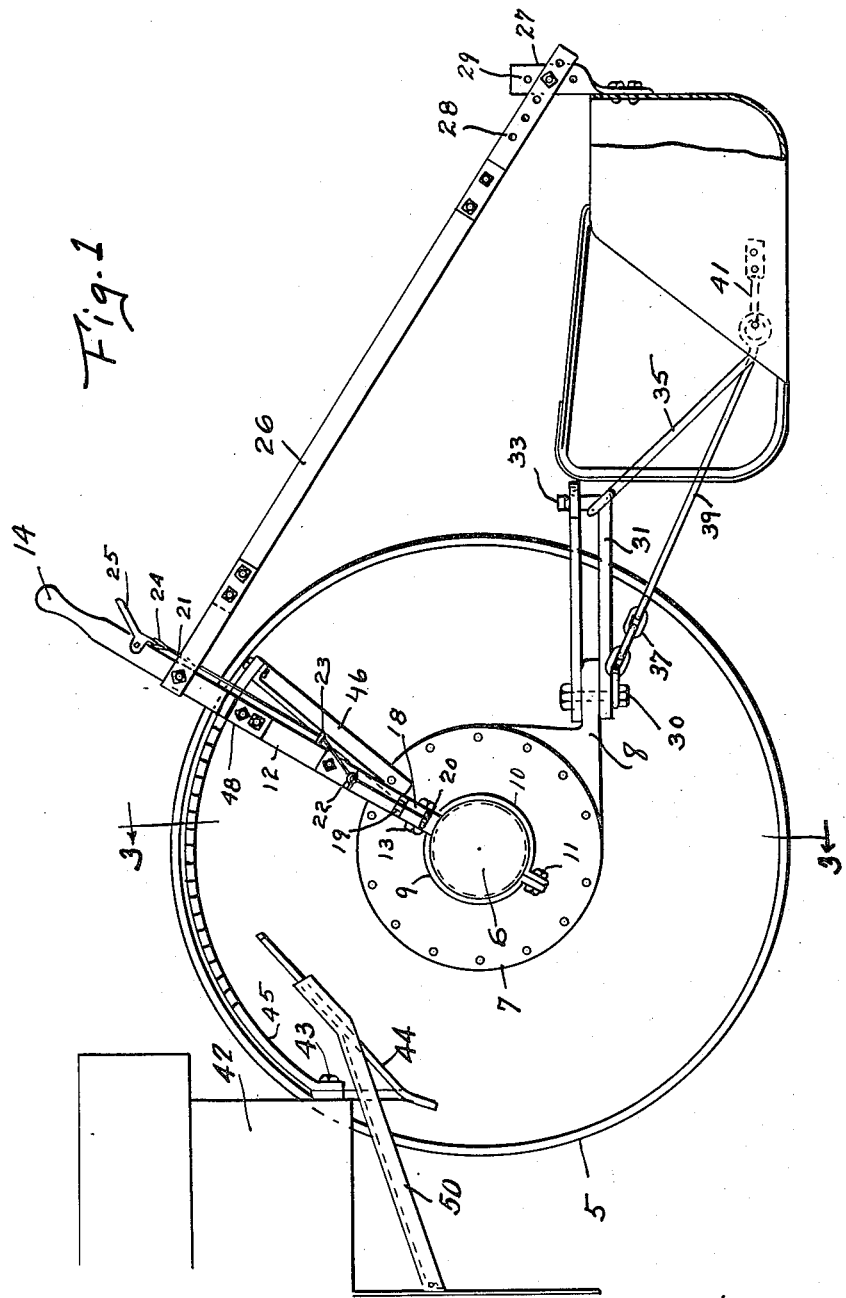

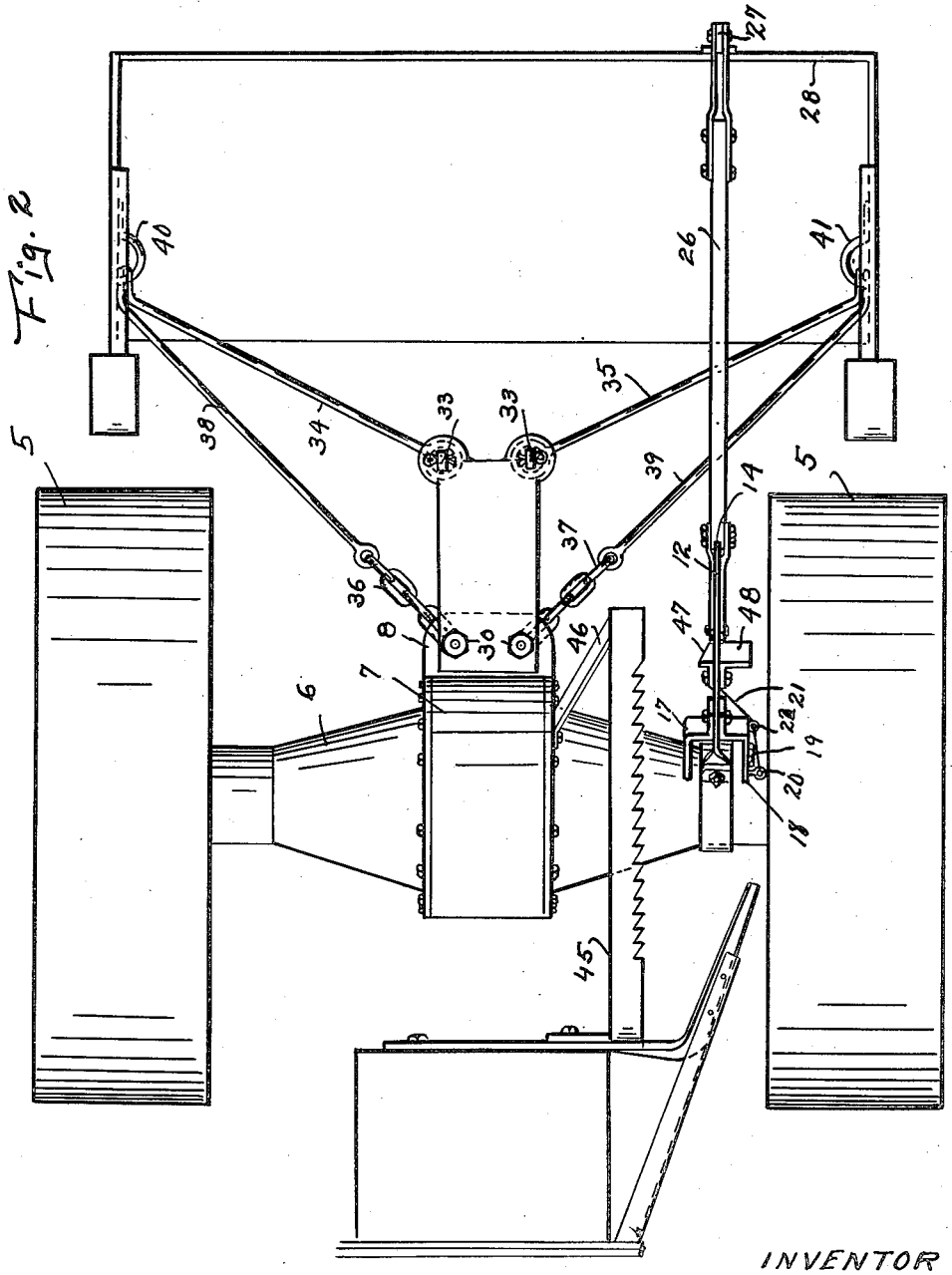

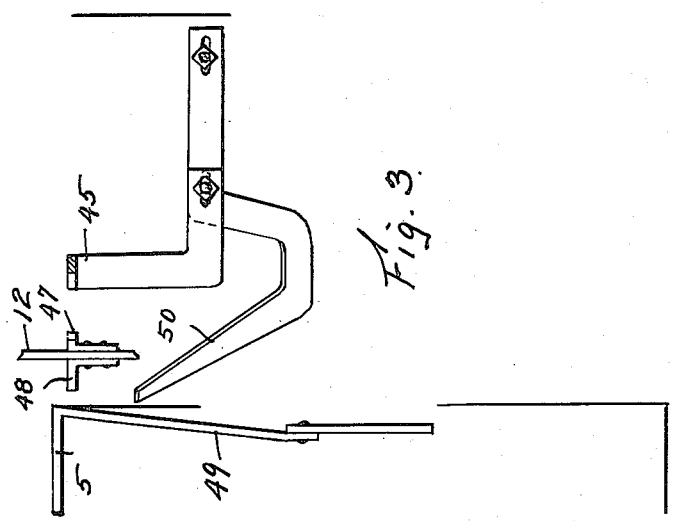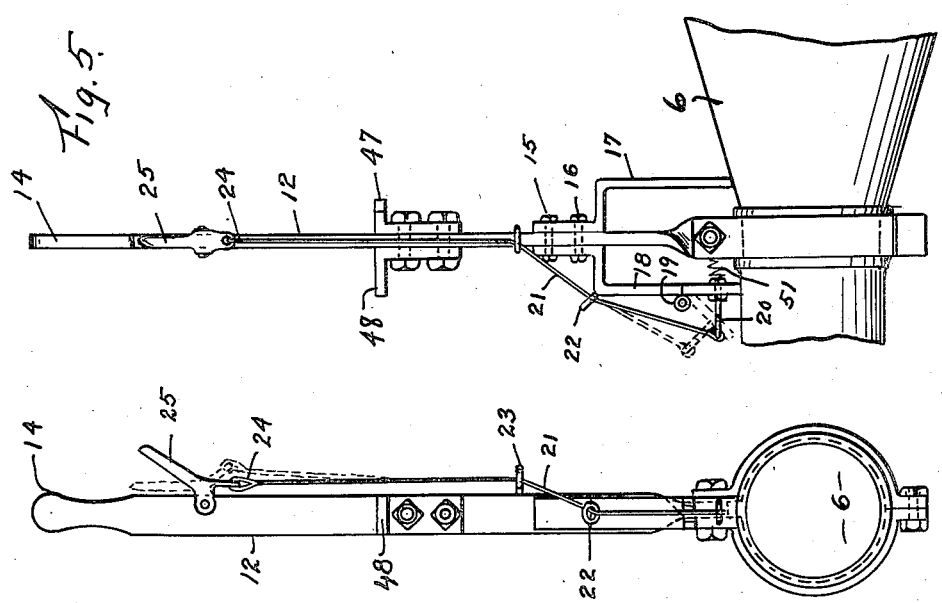

B. LAPADULA 1,524,717

SCRAPER ATTACHMENT FOR TRACTORS

Filed June 13, 1923     4 Sheets-Sheet 4

INVENTOR
BENJAMIN LAPADULA by Frank Batesfield
ATTORNEY

Patented Feb. 3, 1925.

1,524,717

UNITED STATES PATENT OFFICE.

BENJAMIN LAPADULA, OF PIXLEY, CALIFORNIA.

SCRAPER ATTACHMENT FOR TRACTORS.

Application filed June 13, 1923. Serial No. 645,083.

*To all whom it may concern:*

Be it known that I, BENJAMIN LAPADULA, a citizen of the Kingdom of Italy, and resident of Pixley, in the county of Tulare, State of California, have invented certain new and useful Improvements in Scraper Attachments for Tractors, of which the following is a specification.

My invention relates primarily to a scraper attachment for tractors of the character described and claimed in my prior application filed March 17, 1923, Serial No. 625,839, and the object thereof is to provide certain new and useful improvements of the device therein shown and described, which improvements consist in means for controlling the depth of the cut to be taken by the scraper, and means for utilizing the device as a spreader of the material dumped from the scraper, suitable arrangements being provided for varying the depth of the material spread.

A further object is to provide a cheap, simple and efficient device for the above purpose.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Fig. 1 is a side elevation of my improved attachment with sufficient of a tractor of the Fordson type to illustrate my device attached thereto.

Fig. 2 is a top plan of Fig. 1.

Fig. 3 is a partial section on the line 3—3 of Fig. 1.

Fig. 4 is a side elevation of the control members of my device.

Fig. 5 is a rear elevation of the control members of my device.

Figure 6:
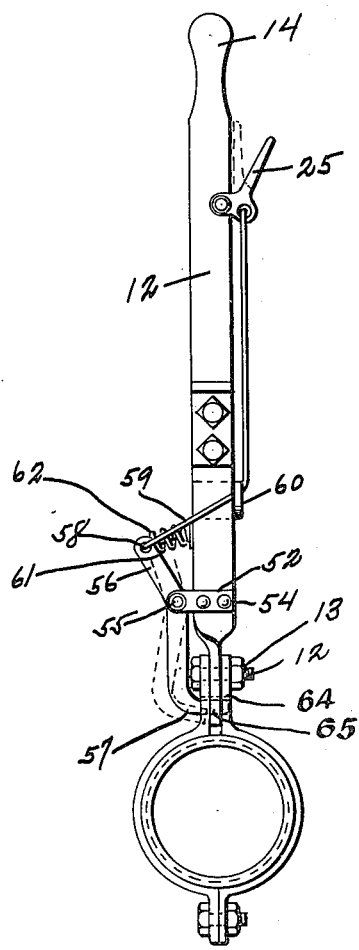
Figs. 6 and 7 are a side and rear elevation respectively of another form of control lever.

Referring to the drawings, 5 indicates the rear wheels of the tractor, 6 the rear axle housing, 7 the transmission case, and 8 the draw bar. Mounted upon the rear axle, at one side thereof, is a split ring formed of two halves 9 and 10, secured together at one end by bolt 11 and having their other ends spaced apart a short distance, and in this spaced apart portion is pivotally mounted one end of the operating lever 12 by means of bolt 13. Lever 12 extends upwardly and rearwardly at an angle and terminates in a handle 14. Secured to opposite sides of lever 12, at a distance above the axle housing 6, by means of bolts 15 and 16, are brackets 17 and 18 which extend outwardly a short distance and then downwardly and their lower ends abut against the axle housing 6 to normally prevent sidewise movement of lever 12. Bracket 18 is provided, a short distance above housing 6, with a hinge 19, and extending outwardly from the lower end of this hinged portion is an eyelet 20 to which is connected the lower end of a flexible wire or cable 21. Cable 21 extends upwardly from eye 20, passes through an eye 22 extending outwardly from the side of bracket 18, then passes through an eye 23 extending rearwardly from the rear edge of lever 12, then passes upwardly parallel with the rear edge of lever 12, and terminates in an eye 24. Eye 24 is loosely mounted in the lower end of a releasing member 25, pivotally mounted upon lever 12, by means of which said cable may be drawn upwardly to move the hinged portion of bracket 18 outwardly and upwardly to permit sidewise movement of lever 12 in that direction. Pivotally connected at one end to lever 12, just below member 25, is a pull bar 26 which extends rearwardly and downwardly and has its other end pivotally connected to a bracket 27 extending upwardly from the rear wall of scraper 28. Member 26 is provided at its rear end with a plurality of holes 28ª and member 27 is provided with a plurality of holes 29, the purpose of which will be obvious. Secured to the under side of the draw bar 8 of the tractor, by means of bolts 30, is a plate 31 which extends rearwardly and has projecting from each of the rear corners thereof hooks 33, and loosely mounted upon these hooks are the free ends of the draw bars 34 and 35 of the scraper 28. Mounted upon the lower ends of bolts 30 are chains 36 and 37 to the free ends of which are connected rods 38 and 39 the other ends of which rods are pivotally mounted upon the hooks 40 and 41 of the scraper. Mounted upon the rear wall of the engine casing 42, by means of bolts 43, is a disengaging member 44, which member extends downwardly and outwardly from said casing and then is bent to extend upwardly and rearwardly and terminates near the inner side of wheel 5 in the path of lever 12, for a purpose to be hereafter explained. Secured at one end to one of the bolts 43 is a toothed segment 45, curved in side elevation, which extends rearwardly and has its free end connected by bracket 46 to the side of the transmission case 7. Extending outwardly from the side of lever 12 is a holding lug 47 the end of which is adapted to engage the teeth of segment 45, as hereafter explained. Extending outwardly from the opposite side of lever 12 is a lug 48 adapted to be engaged by the spokes 49 of wheel 5 to dump the scraper 28. A bracing member 50 is secured at one end to the free end of member 44 and extends rearwardly and has its other end rigidly secured to the casing of the tractor. A coil spring 51 connects the lower end of bracket 18 to bolt 13 and serves to return the hinged portion of said bracket to its operative position.

Figure 7:
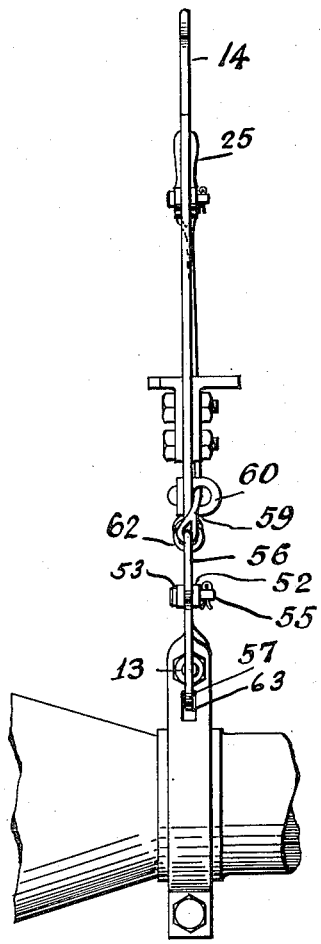

In Figs. 6 and 7 I have shown a modified form of control lever. In this form, at each side of lever 12, near its pivotal connection with the two halves 9 and 10, I provide two forwardly extending links 52 and 53 secured to lever 12 by rivets 54, or otherwise, and pivotally mounted, intermediate its ends, between the free ends of links 52 and 53, by means of pintle 55, is a locking lever 56 one end of which extends downwardly and is bent to form a hook 57 and the other end of which extends upwardly and outwardly at an angle and terminates in an eyelet 58. Mounted within eyelet 58 is one end of an operating cable 59 which passes through an eyelet 60 secured to lever 12 in any suitable manner and thence passes upwardly and has its upper end connected to releasing member 25. Provided on the inner face of the angularly extending end of lever 56 is an inwardly extending stud 61 around which is coiled one end of a coil spring 62. The other end of spring 62 bears against the opposed side of lever 12 and acts to normally hold the upper end of lever 56 outwardly. Formed in the spaced ends of members 9 and 10 are rectangular apertures 63 and 64 which are in register, and a similar aperture 65 is formed in the inner end of lever 12, and in these apertures is adapted to be projected the hook end 57 of lever 56 to lock lever 12 against pivotal movement on bolt 13.

In the operation of my device the parts will normally lie in the positions shown in the drawings, with the scraper in its loading position. When it is desired to dump the scraper the handle of releasing member 25 will be moved towards handle 14 of lever 12, thereby causing cable 21 to swing the lower portion of bracket 18 outwardly upon the hinge 19, or, in the case of the modified form shown in Figs. 6 and 7, to rock lever 56 upon its pivot, withdrawing the hook end 57 from the aperture 64 in member 10 and aperture 65 in the inner end of lever 12, when lever 12 may be moved sidewise until lug 48 is moved into the path of spokes 49 of the wheel 5. As one of the spokes 49 engages lug 48, it being understood that as lever 12 is moved sidewise lug 47 will be drawn out of contact with segment 45, lever 12 will be moved forwardly, and, by means of pull bar 26, the rear end of scraper 28 will be elevated, thereby permitting the material within the scraper to pass out at the front end. As lever 12 approaches its maximum forward movement it will be engaged by the free end of member 44 and drawn outwardly until lug 48 is disengaged from the spoke 49, when spring 51 will act to return the lower hinged end of bracket 18 to its normal position, or, in the case of the modified form shown in Figs. 6 and 7, the spring 62 will act to return the hook end 57 into the apertures 64 and 65, thereby locking lever 12 in its normal inoperative position.

In controlling the depth of cut of the scraper the teeth in segment 45 at the rear of the vertical center of wheel 5 are used, lever 12 being moved forwardly until scraper 28 is tipped sufficiently to secure the depth of cut desired. Lug 47 is then brought into engagement with the desired tooth on segment 45 to prevent further forward movement of lever 12.

In spreading the material dumped from scraper 28 the teeth in segment 45 at the front of the vertical center of wheel 5 are used, lever 12 being moved forwardly until the point of scraper 28 is elevated the desired distance above the ground. Lug 47 is then brought into engagement with the desired tooth to hold the same positioned, it being understood that the resistance of the point of scraper 28 to the forward travel of the tractor will, by means of pull bar 26, tend to move lever 12 forwardly but that the same will be prevented by the engagement of lug 47 with the teeth of segment 45.

In the use of my device as shown in my prior application Serial No. 625,839, filed March 17, 1923, it has been found that the rigid draw bar connection from the draw bar 8 of the tractor to the scraper can be made more satisfactory relative to turning corners so that the scraper will not swing around with the rear end of the tractor, and this improvement is made by providing chains 36 and 37 and rods 38 and 39 that form a flexible connection between the tractor and scraper, thus permitting the scraper to turn with the tractor instead of swinging with the tractor as heretofore.

Having described my invention, what I claim is:

1. A scraper attachment for tractors comprising a scraper; a flexible connection from said scraper to the draw bar of a tractor; a control lever for said scraper rockably mounted upon the rear axle of said tractor to move radially thereto and also capable of manual movement sidewise to the vehicle; a connection from the upper end of said lever to the rear wall of said scraper; means mounted on said lever adapted upon sidewise movement thereof to engage a rotating member of said tractor to move the said lever forwardly and dump said scraper.

2. A tractor attachment comprising a scraper; a connection from said scraper to the draw bar of a tractor; a lever rotatably mounted at one end upon the axle housing of said tractor to extend radially capable of manual movement sidewise to the vehicle; a connection from the upper end of said lever to said scraper whereby forward movement of said lever will elevate the rear end of said scraper; means mounted on said lever adapted upon sidewise movement thereof in one direction to engage the tractor wheel whereby said lever is operated to dump said scraper; means mounted on said tractor adapted to release said last means at a predetermined time; and means carried by said tractor adapted upon sidewise movement of said dumping means in the other direction for adjusting the position of said lever to control the position of the cutting point of said scraper.

3. A scraper attachment for tractors comprising a scraper; a flexible connection between the front end of said scraper and the draw bar of a tractor; means carried by said tractor, and operable by the rotation of the wheels thereof, for dumping said scraper; means to release said last means; and means to adjust said dumping means to govern the position of the cutting edge of said scraper.

4. A scraper attachment for tractors comprising a scraper; a flexible connection from the front end of said scraper to the draw bar of a tractor; a lever rotatably mounted upon the axle housing of said tractor; a connection from said lever to the rear wall of said scraper whereby when said lever is moved forwardly the rear wall of said scraper will be elevated to permit dumping of said scraper; means mounted on said lever adapted for engagement with the tractor wheel, whereby said lever is moved forwardly; means to release said lever at a predetermined time; means to hold said lever positioned at any one of a plurality of points throughout its movement; means to retain said lever against engagement with said wheel; and means to release said last means.

5. An attachment of the class described comprising a lever pivotally connected to a power propelled vehicle, said lever adapted to be manually moved sidewise to the vehicle and also moved in an arc toward the front and rear of the vehicle; a scraper; a flexible connection from said lever to said scraper; a rotary element on the vehicle that is adapted to engage and move said lever in an arc toward the front of the vehicle to move said scraper when said lever is manually moved sidewise into engagement with said rotary element; and means for disengaging said lever from said rotary element after said scraper has been moved to a predetermined position.

6. A tractor attachment comprising a scraper; a connection from said scraper to the draw bar of a tractor; a lever rockably mounted upon said tractor adapted to be brought into engagement with a rotating element carried by said tractor to rock said lever forwardly in an arc; a connection from said lever to said scraper adapted when said lever is moved forwardly to move said scraper to its dumping position; and means to lock said lever in any one of a plurality of positions throughout its movement forwardly.

7. A tractor attachment comprising a scraper; a connection from said scraper to the draw bar of a tractor; a lever rockably mounted upon said tractor adapted to be brought into engagement with a rotating element carried by said tractor to rock said lever forwardly in an arc or to be brought into engagement with a stationary element to lock said lever in any one of a plurality of positions in its forward path of movement; a connection from said lever to said scraper adapted when said lever is moved forwardly to move said scraper to its dumping position.

8. The attachment set forth comprising a rocking bearing; a power driven rotary element adjacent said bearing; a lever having one end pivotally connected to said rocking bearing, said lever being adapted to be manually actuated sidewise to said bearing to move said lever into driving engagement with said rotary element or into engagement with a locking member; a body connected with said lever that is adapted to move therewith when said lever is actuated by said rotary element: and means for disengaging said lever from said rotary element after it has been moved a predetermined distance.

9. The attachment set forth comprising a rocking bearing ring; an axle housing on which said ring is loosely mounted; a power driven rotary element adjacent said ring; a toothed segment mounted adjacent said ring; a lever having one end pivotally connected to said ring, said lever being adapted to be actuated sidewise to said ring to move it into driving engagement with said rotary element or into locking engagement with said toothed segment; a body; a connection from said lever to said body, said connection being adapted to move said body when said lever is actuated by said rotary element; and means for disengaging said lever from said rotary element after said body has been moved a predetermined distance.

10. The attachment set forth comprising a split ring that is mounted and adapted to rock on a pivot; a power driven wheel adjacent said split ring, said wheel having spokes; a stationary toothed segment adjacent said wheel; a lever having one end pivotally connected to said split ring; a projection on each side of said lever, said lever adapted to be actuated sidewise to said split ring to move one of said projections into driving engagement with a spoke of said wheel or to move the other of said projections into engagement with said toothed segment; a body; a pull bar connecting said lever with said body, said pull bar adapted to move said body when said projection is engaging a spoke and is actuated by said wheel; and an automatic means for disengaging said projection from a spoke of said wheel when said body has been moved a predetermined distance.

In witness that I claim the foregoing I have hereunto set my hand this 3rd day of May, 1923.

BENJAMIN LAPADULA.